No. 703,723. Patented July 1, 1902.
F. FRANKE.
FEATHER QUILLER.
(Application filed Jan. 20, 1902.)
(No Model.)
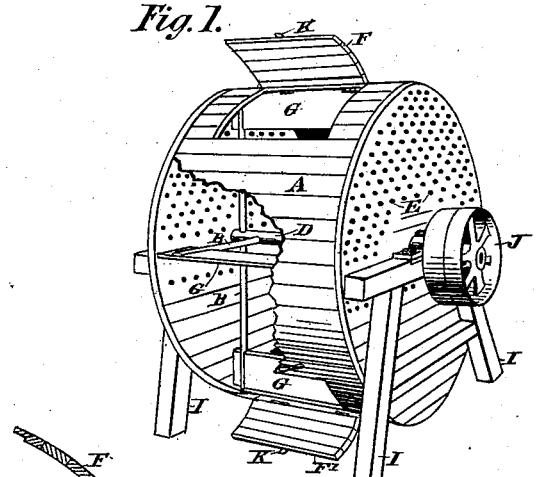
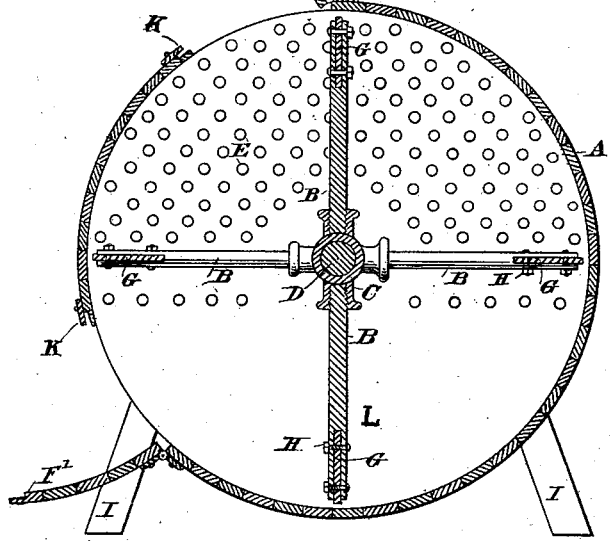
Witnesses
H. H. Beynroth
Annie B. Knobel
Inventor
Ferdinand Franke.
By Attorney
Abraham Knobel

UNITED STATES PATENT OFFICE.

FERDINAND FRANKE, OF LOUISVILLE, KENTUCKY, ASSIGNOR TO S. D. CRUSE, OF LOUISVILLE, KENTUCKY.

FEATHER-QUILLER.

SPECIFICATION forming part of Letters Patent No. 703,723, dated July 1, 1902.

Application filed January 20, 1902. Serial No. 90,529. (No model.)

*To all whom it may concern:*

Be it known that I, FERDINAND FRANKE, a citizen of the United States, residing at Louisville, in the county of Jefferson and State of Kentucky, have invented a new and useful Feather-Quiller, of which the following is a specification.

My improvement relates to machines for separating the quills and foreign matter from feathers in the manufacture of bedding, &c.; and the objects of my improvement are, first, simplicity of construction; second, effectiveness; third, ease of operation, and, fourth, rapidity of operation. I attain these objects by means of the mechanism illustrated in the accompanying drawings, in which—

Figure 1 is a perspective view of the entire machine with parts broken away to show the internal mechanism, and Fig. 2 a vertical section transverse to the shaft.

Similar characters refer to similar parts throughout the two views.

The drum A, the stand I, and the fan L constitute the body of the invention.

D is the shaft, which passes through the axis of the drum A; C, a spider secured to shaft D; B, radial arms secured in spider C; G, vanes or paddles secured at the extremities of radial arms B; E, perforations in the heads of the drum A; F, the charging-door; F′, the quill and refuse discharging door; H, bolts for fastening vanes G in radial arms B; J, the driving-pulley on shaft D; K, latches for fastening doors F and F′.

The holes E are of such size that only small soft feathers and down may escape through them, while the quills are prevented. The vanes G are made broad enough to produce a suitable fanning effect. The drum A may be built up of wood or made of sheet metal. I prefer to make it of wood, making the circular heads as smooth as practicable within and boring the holes E through them and making them also smooth in order that the down may not hang. The upper half of these heads is perforated from the center to the circumference. Those perforations near the center admit air to fill the partial vacuum formed by the centrifugal action of the vanes G, while those near the circumference emit the air in which down is suspended. The perforations are preferably circular because thus least liable to cause the down and feathers to hang and so become blocked. The entire periphery of the drum is closed. The shaft D is journaled in boxes which are bolted on frame 1.

In use the machine is placed in a large room, a charge of feathers is put in at the door F, the door F closed, and the machine started. The revolving fan draws in air through the holes in the heads of the drum near the center and expels it through the holes near the circumference. The air blowing out carries the down and light feathers with it. This action is continued till only quills and refuse remain, when the door F′ is opened and these removed. The feathers and down settle in the room and are gathered up.

I am aware that machines for quilling feathers have been made with wire screens in the periphery of the drum; but the difficulty with these has been that the centrifugal action of the rotary stirrer throws the quills and other heavier matter forcibly against the screens and blocks them and much pulverized matter issues with the down. With my improvement the heavier matter is thrown to the periphery and kept there, while the lighter down, suspended in the air nearer the center, floats gently out through the perforations.

Having thus described my invention so that any one skilled in the art pertaining thereto may make and use it, I desire not to be confined minutely to the construction described, nor do I desire to claim the parts here shown broadly; but

What I do claim as my invention, and desire to secure by Letters Patent, is—

In a machine for quilling feathers, the combination of a drum-shaped casing, a shaft journaled axially in said casing, radial arms secured on said shaft, fan-vanes secured on the outer ends of said radial arms, a door at the top of the periphery of said casing for charging, a discharging-door at the bottom of the periphery of said casing, and heads in said casing, the upper half of which is perforated near the center with holes for admitting air, and near the circumference with holes for the emission of air and down suspended therein, substantially as specified.

FERDINAND FRANKE.

Witnesses:
N. RUDDICK,
MAUD SANDIDGE.